US012771207B2

(12) United States Patent
Li

(10) Patent No.: US 12,771,207 B2
(45) Date of Patent: Oct. 20, 2026

(54) TRANSMISSION MECHANISM HAVING COOLING FLOW PATH, AND ELECTRIC BRIDGE DRIVE SYSTEM

(71) Applicant: Schaeffler Technologies AG & Co. KG, Herzogenaurach (DE)

(72) Inventor: Xin Li, Shanghai (CN)

(73) Assignee: Schaeffler Technologies AG & Co. KG, Herzogenaurach (DE)

(*) Notice: Subject to any disclaimer, the term of this patent is extended or adjusted under 35 U.S.C. 154(b) by 222 days.

(21) Appl. No.: 18/709,608

(22) PCT Filed: Oct. 22, 2021

(86) PCT No.: PCT/CN2021/125562
§ 371 (c)(1),
(2) Date: May 13, 2024

(87) PCT Pub. No.: WO2023/065281
PCT Pub. Date: Apr. 27, 2023

(65) Prior Publication Data

US 2025/0015668 A1 Jan. 9, 2025

(51) Int. Cl.

| | |
|---|---|
| ***H02K 7/00*** | (2006.01) |
| ***F16C 3/02*** | (2006.01) |
| ***H02K 9/19*** | (2006.01) |

(52) U.S. Cl.
CPC ............... *H02K 7/003* (2013.01); *F16C 3/02* (2013.01); *H02K 9/19* (2013.01); *F16C 2380/26* (2013.01)

(58) Field of Classification Search
CPC ......... F16C 2380/26; F16C 3/02; H02K 1/30; H02K 1/32; H02K 7/003; H02K 9/19;
(Continued)

(56) References Cited

U.S. PATENT DOCUMENTS

| | | | | |
|---|---|---|---|---|
| 6,191,511 | B1 * | 2/2001 | Zysset | H02K 9/197 310/59 |
| 9,252,642 | B2 * | 2/2016 | Büttner | H02K 9/225 |

FOREIGN PATENT DOCUMENTS

| | | | |
|---|---|---|---|
| CN | 110311506 | A | 10/2019 |
| CN | 212426181 | U | 1/2021 |

(Continued)

OTHER PUBLICATIONS

DE-102018204691-A1, all pages (Year: 2019).*

*Primary Examiner* — Naishadh N Desai
(74) *Attorney, Agent, or Firm* — Volpe Koenig

(57) ABSTRACT

A transmission mechanism having a cooling flow path, the transmission mechanism comprising a shaft assembly and an inner cylinder. A first annular rib portion is formed on an outer peripheral wall of one axial end of the inner cylinder to close a gap between the axial end of the inner cylinder and the shaft assembly, and a second annular rib portion is formed on an outer peripheral wall of the other axial end of the inner cylinder to close a gap between the other axial end of the inner cylinder and the shaft assembly, such that a cooling medium entering from an inlet of the shaft assembly can flow through a central hole, a communication hole, an intermediate space and a discharge hole to be discharged to the outside of the shaft assembly. An electric bridge drive system including the transmission mechanism.

14 Claims, 11 Drawing Sheets

(58) Field of Classification Search
CPC ........ H02K 9/223; H02K 9/227; H02K 99/00; H02K 2201/00; H02K 2203/00; H02K 2205/00; H02K 2207/00; H02K 2209/00; H02K 2211/00; H02K 2213/00; H02K 2215/00; H02K 51/00; H02K 47/00
See application file for complete search history.

(56) References Cited

FOREIGN PATENT DOCUMENTS

| | | | | | |
|---|---|---|---|---|---|
| DE | 102018104131 | A1 | | 8/2019 | |
| DE | 102018204691 | A1 | * | 10/2019 | ............ H02K 9/193 |
| WO | 2020094512 | A1 | | 5/2020 | |

* cited by examiner

TRANSMISSION MECHANISM HAVING COOLING FLOW PATH, AND ELECTRIC BRIDGE DRIVE SYSTEM

CROSS-REFERENCE TO RELATED APPLICATIONS

This application is the U.S. National Phase of PCT Appln. No. PCT/CN2021/125562, filed Oct. 22, 2021, the entire disclosure of which is incorporated by reference herein.

TECHNICAL FIELD

The present application relates to the field of motive power systems for vehicles, and in particular to a transmission mechanism for a vehicle having a cooling flow path and an e-axle drive system including the same.

BACKGROUND

In a pure electric vehicle, a motor is used as a motive power source, and a so-called e-axle drive system is composed of the motor and a transmission. In the above-mentioned e-axle drive system, a rotor of the motor and the transmission are in transmission connection via a transmission mechanism including a shaft assembly. In order to cool the rotor of the motor, oil at a position where the transmission is located can be transmitted to a position where the rotor of the motor is located via the shaft assembly for cooling, and the oil can then be transmitted back to the position where the transmission is located. However, components of the shaft assembly for realizing this function need high processing precision, and the assembly process thereof is complicated and takes a long time.

SUMMARY DISCLOSURE

It is an object of the present application to provide a transmission mechanism having a cooling flow path. The transmission mechanism overcomes the problems of high processing precision, complicated assembly process and long assembly time caused by interference fit among an inner cylinder of a shaft assembly and other components. It is another object of the present application to provide an e-axle drive system including the above-mentioned transmission mechanism.

To achieve the above-mentioned disclosure objects, the following technical solutions are provided according to the present application.

A transmission mechanism having a cooling flow path is provided according to the present application, which includes:

a shaft assembly, where a shaft hole and a discharge hole are formed in the shaft assembly, the shaft hole extends along an axial direction of the shaft assembly, an inlet of the shaft hole is formed at one axial end portion of the shaft assembly, and the discharge hole extends through a wall of the shaft hole; and an inner cylinder, where the inner cylinder is accommodated in the shaft hole, an intermediate space is formed between an outer circumferential wall of the inner cylinder and an inner circumferential wall of the shaft assembly, a central hole and a communication hole are formed in the inner cylinder, the central hole extends along an axial direction of the inner cylinder and is in communication with the inlet, the communication hole extends through a wall of the central hole, one or more first annular rib portions are formed on the outer circumferential wall of the inner cylinder at one axial end portion, the one or more first annular rib portions abut against the inner circumferential wall of the shaft assembly, to seal a gap between the one axial end portion of the inner cylinder and the shaft assembly, one or more second annular rib portions are formed on the outer circumferential wall of the inner cylinder at the other axial end portion, and the one or more second annular rib portions abut against the inner circumferential wall of the shaft assembly, to seal a gap between the other axial end portion of the inner cylinder and the shaft assembly, where the intermediate space is in communication with a space outside the shaft assembly through the discharge hole, and the central hole is in communication with the intermediate space through the communication hole, so that a cooling medium entering from the inlet is discharged out of the shaft assembly through the central hole, the communication hole, the intermediate space and the discharge hole.

In an alternative solution, the inner cylinder includes multiple circumferential portions made of plastic. The multiple circumferential portions extend along a circumferential direction of the inner cylinder, a rib portion abutting against the inner circumferential wall of the shaft assembly is formed on each of the multiple circumferential portions, and the rib portion is configured such that the multiple circumferential portions are engaged with each other to jointly define the central hole.

In another alternative solution, the multiple circumferential portions include a first circumferential portion and a second circumferential portion. The first circumferential portion includes a first arc-shaped main body, the second circumferential portion includes a second arc-shaped main body fitting with the first arc-shaped main body, the first arc-shaped main body and the second arc-shaped main body extend along the axial direction of the inner cylinder and each have an arc-shaped cross section, and a circumferential end portion of the first arc-shaped main body abuts against a circumferential end portion of the second arc-shaped main body in a state that the first circumferential portion and the second circumferential portion are engaged with each other.

In another alternative solution, the circumferential end portion of the first arc-shaped main body is recessed, and the circumferential end portion of the second arc-shaped main body is inserted into the recessed circumferential end portion of the first arc-shaped main body, so that the first circumferential portion is fixed relative to the second circumferential portion in the circumferential direction and a radial direction of the inner cylinder.

In another alternative solution, one of the first circumferential portion and the second circumferential portion has a position-limiting recess, the other of the first circumferential portion and the second circumferential portion has a position-limiting protrusion, and the position-limiting recess fits with the position-limiting protrusion, so that the first circumferential portion is fixed relative to the second circumferential portion in the axial direction of the inner cylinder.

In another alternative solution, each of the circumferential portions has multiple rib portions, and the multiple rib portions extend along the axial direction of the inner cylinder, for one of the circumferential portions, the multiple rib portions extend from different circumferential parts of the circumferential portion and abut against different circumferential parts of the inner circumferential wall of the shaft assembly.

In another alternative solution, the shaft assembly includes a main shaft and a shaft cap, a main shaft through-hole extending along an axial direction of the main shaft is formed in the main shaft, an opening of the main shaft through-hole at one axial end portion of the main shaft is used as the inlet, and the shaft cap is fixed at the other axial end portion of the main shaft to seal an opening of the main shaft through-hole at the other axial end portion of the main shaft.

In another alternative solution, the main shaft through-hole includes a first axial section, an intermediate section and a second axial section which are arranged from the one axial end portion of the main shaft to the other axial end portion of the main shaft and are in communication with one another, a cross-sectional area of the main shaft through-hole increases in stages as the main shaft through-hole passes through the first axial section, the intermediate section and the second axial section, the discharge hole is in communication with the intermediate section, and a part of the inner cylinder including the one axial end portion of the inner cylinder extends into the intermediate section, a shaft cap blind hole in communication with the main shaft through-hole is formed in the shaft cap, and a part of the inner cylinder including the other axial end portion of the inner cylinder extends into the shaft cap blind hole.

An e-axle drive system is further provided according to the present application, which includes the above-mentioned transmission mechanism having the cooling flow path according to any one of the preceding technical solutions.

In an alternative solution, the e-axle drive system further includes a housing, a transmission and a motor, where the housing includes a first space and a second space spaced apart from each other, the transmission is accommodated in the first space, the motor is accommodated in the second space, both the inlet and the discharge hole are located in the first space, and a rotor of the motor is anti-torsion connected with a part of the transmission mechanism located in the second space.

By using the preceding technical solutions, the novel transmission mechanism having the cooling flow path and the e-axle drive system including the transmission mechanism are provided according to the present application. The transmission mechanism includes the shaft assembly and the inner cylinder. The shaft hole and the discharge hole are formed in the shaft assembly, the shaft hole extends along the axial direction of the shaft assembly, the inlet of the shaft hole is formed at the one axial end portion of the shaft assembly, and the discharge hole extends through the wall of the shaft hole. The inner cylinder is accommodated in the shaft hole, the intermediate space is formed between the outer circumferential wall of the inner cylinder and the inner circumferential wall of the shaft assembly, the central hole and the communication hole are formed in the inner cylinder, the central hole extends along the axial direction of the inner cylinder and is in communication with the inlet, and the communication hole extends through the wall of the central hole. The inner cylinder includes the multiple circumferential portions. The multiple circumferential portions extend along the circumferential direction of the inner cylinder, the rib portion abutting against the inner circumferential wall of the shaft assembly is formed on each of the circumferential portions, and the rib portion is configured such that the multiple circumferential portions are engaged with each other to jointly define the central hole. The first annular rib portion is formed on the outer circumferential wall of the inner cylinder at the one axial end portion, and the first annular rib portion abuts against the inner circumferential wall of the shaft assembly, to seal the gap between the one axial end portion of the inner cylinder and the shaft assembly. The second annular rib portion is formed on the outer circumferential wall of the inner cylinder at the other axial end portion, and the second annular rib portion abuts against the inner circumferential wall of the shaft assembly, to seal the gap between the other axial end portion of the inner cylinder and the shaft assembly. In this way, the intermediate space is in communication with the space outside the shaft assembly through the discharge hole, and the central hole is in communication with the intermediate space through the communication hole, so that the cooling medium entering from the inlet can be discharged out of the shaft assembly through the central hole, the communication hole, the intermediate space and the discharge hole.

In the transmission mechanism described above, by providing the annular rib portions, the cooling flow path can be realized in the transmission mechanism without interference fit between the two axial end portions (the outer circumferential surfaces of the two axial end portions) of the inner cylinder and the shaft assembly, allowing the processing precision of corresponding parts of the two axial end portions of the inner cylinder and the shaft assembly to be reduced. Thus, the assembly process can be simplified and the assembly time can be shortened while achieving the same function. Further, the e-axle drive system including the above-mentioned transmission mechanism has the same beneficial effects.

DESCRIPTION OF REFERENCE NUMERALS

Figure 1A:
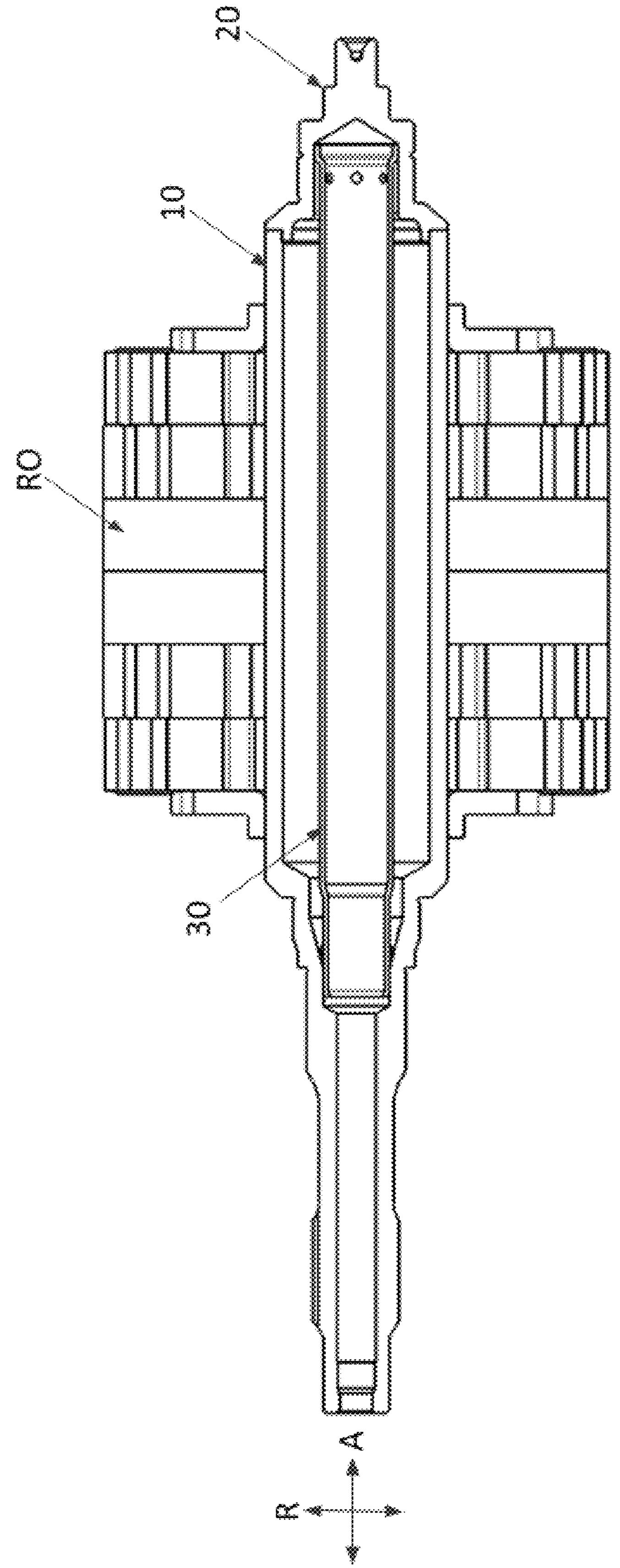
FIG. 1A is a schematic cross-sectional view showing a partial structure of a possible e-axle drive system, where a rotor of a motor and a transmission mechanism are shown in an assembled state.

10 main shaft
10*h*1 main shaft through-hole
10*h*2 discharge hole
20 shaft cap
20*h* shaft cap blind hole
30 inner cylinder
30*h*1 central hole
30*h*2 communication hole
1 main shaft
1*h*1 main shaft through-hole
1*h*11 first axial section
1*h*12 second axial section
1*h*13 intermediate section
1*h*2 discharge hole
2 shaft cap
21 flange portion
22 mounting portion
2*h* shaft cap blind hole
3 inner cylinder
3*a* one axial end portion of inner cylinder
3*a*1 first annular rib portion
3*b* the other axial end portion of inner cylinder
3*b*1 second annular rib portion
3*h*1 central hole
3*h*2 communication hole
31 first circumferential portion
311 first arc-shaped main body
312 first rib portion
313 position-limiting recess
32 second circumferential portion
321 second arc-shaped main body
322 second rib portion
323 position-limiting protrusion
R0 rotor
S intermediate space
A axial direction
R radial direction
C circumferential direction.

DETAILED DESCRIPTION

Exemplary embodiments of the present application are described below with reference to the accompanying drawings. It should be understood that these specific descriptions are only used to teach those skilled in the art how to implement the present application, and are neither intended to be exhaustive of all possible implementations of the present application nor to limit the scope of the present application.

As shown in FIG. 1A, in a possible design of an e-axle drive system, a rotor R0 of a motor is mounted to a main shaft 10 of a transmission mechanism and is anti-torsion connected with the main shaft 10 of the transmission mechanism. A cooling flow path, for a cooling medium such as oil to flow therein, is formed in the transmission mechanism, and the rotor R0 of the motor can be cooled by the cooling medium, thereby improving the heat dissipation capacity of the motor.

Figure 1B:
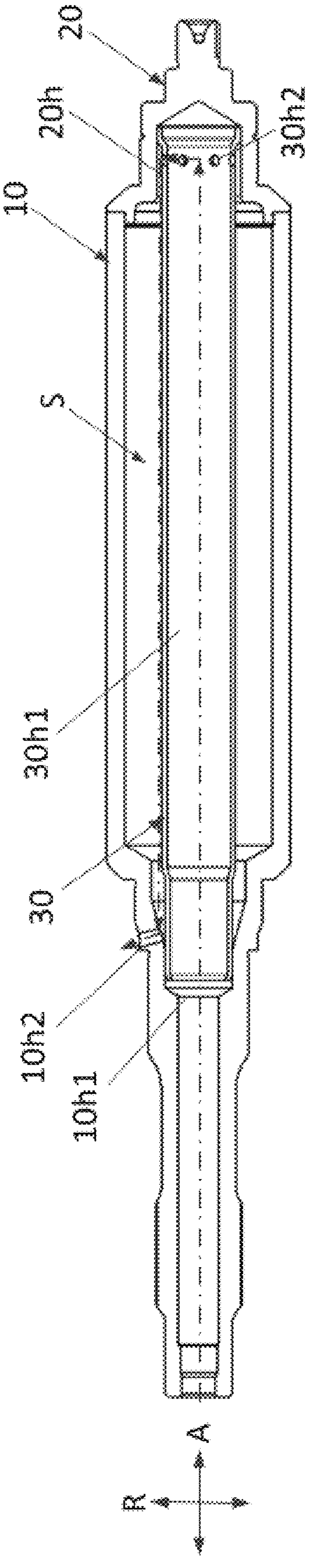
FIG. 1B is a schematic cross-sectional view of the transmission mechanism in FIG. 1A, where a dash-dot line with arrows indicates a flow direction of a cooling medium in a cooling flow path.

As shown in FIG. 1B, the transmission mechanism includes a main shaft 10, a shaft cap 20 and an inner cylinder 30 which are assembled together. A main shaft through-hole 10*h*1 is formed in the main shaft 10. An opening of the main shaft through-hole 10*h*1 at one axial end portion (a left end portion in FIG. 1B) of the main shaft 10 is used as an inlet for the cooling medium. In addition, a discharge hole 10*h*2 is formed in a wall of the main shaft 10 for forming the main shaft through-hole 10*h*1. The shaft cap 20 is fixed to the other axial end portion of the main shaft 10 by interference fit, and seals an opening of the main shaft through-hole 10*h*1 at the other axial end portion (a right end portion in FIG. 1B) of the main shaft 10. A shaft cap blind hole 20*h* formed in the shaft cap 20 is in communication with the main shaft through-hole 10*h*1. The inner cylinder 30 is mounted in a space surrounded by the main shaft 10 and the shaft cap 20, and is arranged coaxially with the main shaft 10 and the shaft cap 20. Most of the inner cylinder 30 including one axial end portion of the inner cylinder 30 is located in the main shaft through-hole 10*h*1, and the rest of the inner cylinder 30 including the other axial end portion of the inner cylinder is located in the shaft cap blind hole 20*h* of the shaft cap 20. An intermediate space S is formed between an outer circumferential wall of the inner cylinder 30 and an inner circumferential wall of the main shaft 10. A central hole 30*h*1 extending along an axial direction A and a communication hole 30*h*2 communicating the central hole 30*h*1 with the intermediate space S are formed in the inner cylinder 30. In this way, the cooling medium flows in the cooling flow path in a direction indicated by the dash-dot line with arrows in FIG. 1B. When the cooling medium flows through the intermediate space S, it takes away the heat of the rotor R0 of the motor, thereby achieving the purpose of cooling.

In the transmission mechanism, in order to realize the cooling flow path for the flow of cooling medium in the transmission mechanism, the whole one axial end portion of the inner cylinder 30 and the main shaft 10 are fixed and sealed by interference fit, and the whole other axial end portion of the inner cylinder 30 and the shaft cap 20 are fixed and sealed by interference fit. As such, regions of the two axial end portions of the inner cylinder 30 for achieving interference fit, and corresponding regions of the main shaft 10 and the shaft cap 20 need high processing precision, and so the processing cost of components is high, and the assembly process is complicated and takes a long time.

In view of the above-mentioned situation, the following embodiments are further provided.

It should be understood that although some disadvantages of the transmission mechanism shown in FIG. 1A and FIG. 1B have been described above, at least some aspects or features thereof are still novel and advantageous compared with the conventional art, and FIG. 1A, FIG. 1B and the above description still constitute a part of the innovative embodiments of the present application.

In the present application, unless otherwise specified, "axial direction", "radial direction" and "circumferential direction" refer to the axial direction, radial direction and circumferential direction of the shaft assembly, respectively; "one axial end portion" of each component refers to the left end portion of the component in FIG. 2A, and "the other axial end portion" of each component refers to the right end portion of the component in FIG. 2A; and "radial outer side" refers to the side away from a central axis of the shaft assembly in the radial direction, and "radial inner side" refers to the side close to the central axis of the shaft assembly in the radial direction.

In the present application, the "anti-torsion connection" refers to a connection between two components that can transmit torque, and these two components can rotate together during transmission of torque.

A structure of a transmission mechanism according to an embodiment of the present application will be described with reference to the accompanying drawings of the specification.

As shown in FIG. 2A to FIG. 5B, a transmission mechanism having a cooling flow path according to an embodiment of the present application includes a shaft assembly (a main shaft 1 and a shaft cap 2) and an inner cylinder 3. The main shaft 1, the shaft cap 2 and the inner cylinder 3 are assembled coaxially together to form the cooling flow path, for a cooling medium to flow therein, in the transmission mechanism.

In this embodiment, as shown in FIG. 2A to FIG. 2E, the shaft assembly includes the main shaft 1 and the shaft cap 2. The main shaft 1 and the shaft cap 2 are fixed to each other and form a shaft hole inside the shaft assembly.

Figure 2A:
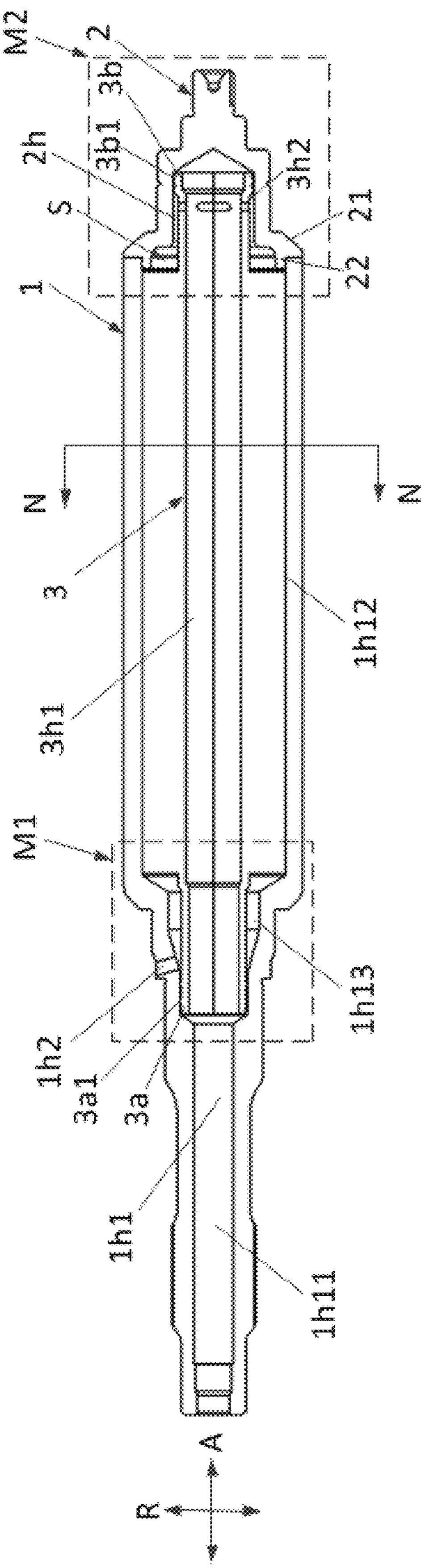
FIG. 2A is a schematic cross-sectional view of a transmission mechanism having a cooling flow path according to an embodiment of the present application, where the transmission mechanism can be applied to an e-axle drive system instead of the transmission mechanism in FIG. 1B.
Figure 2B:
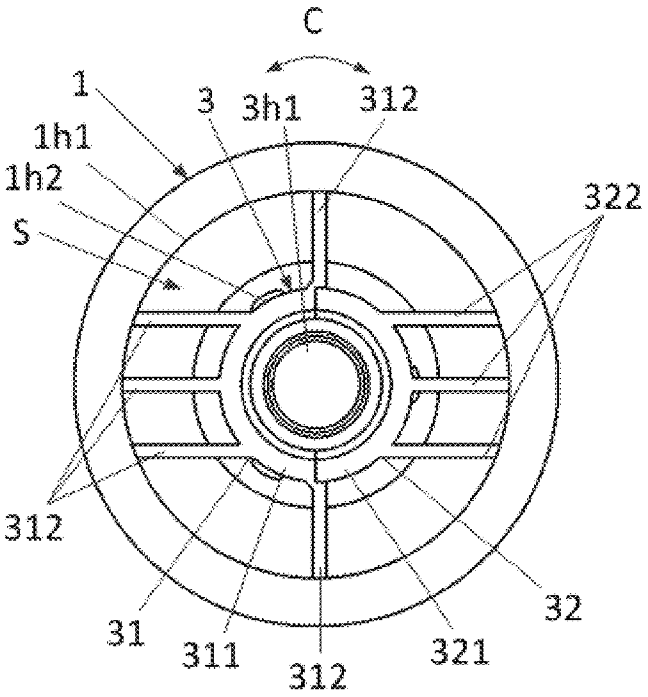
FIG. 2B is a schematic cross-sectional view of the transmission mechanism having the cooling flow path in FIG. 2A taken along line N-N.
Figure 2C:
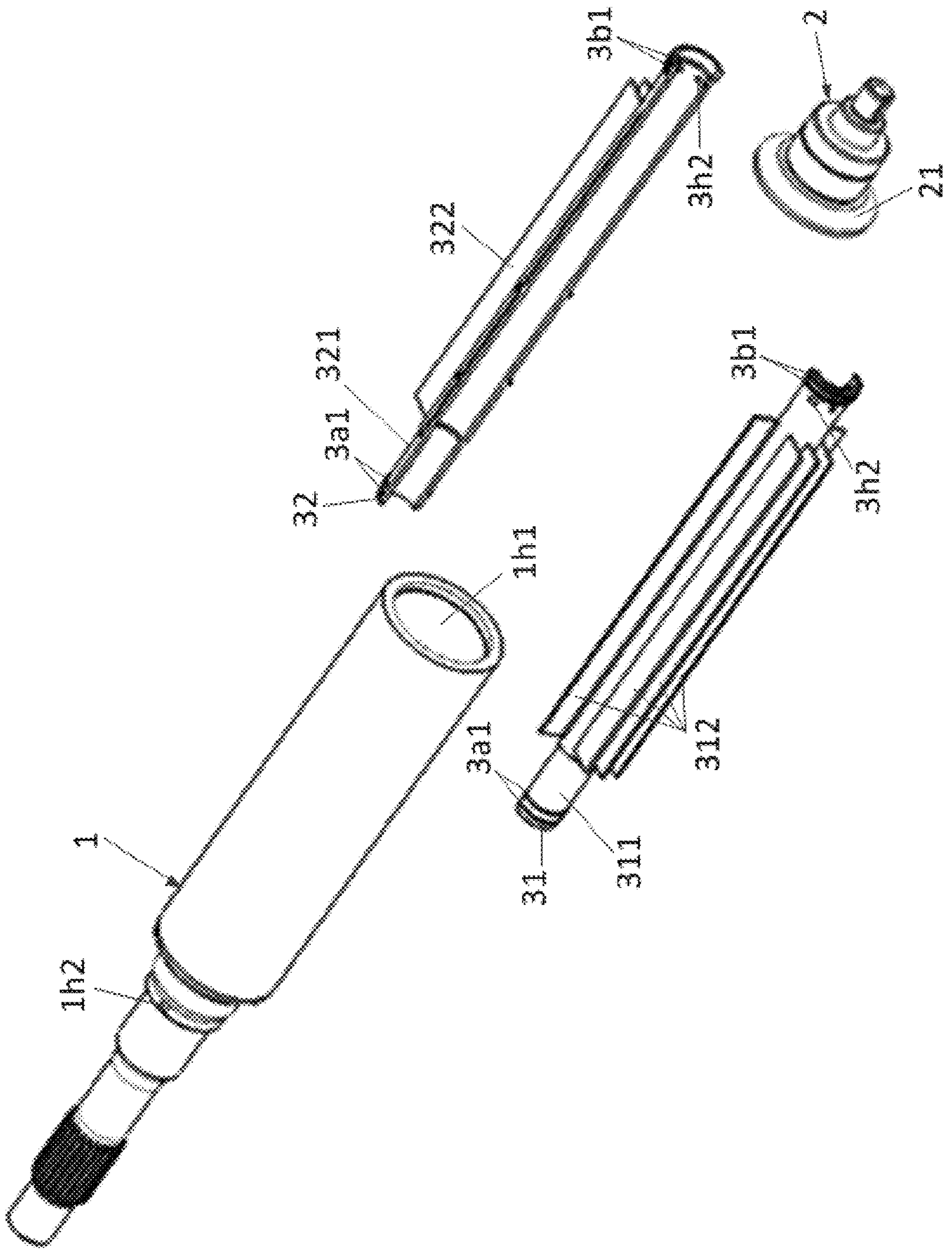
FIG. 2C is a schematic exploded view of the transmission mechanism having the cooling flow path in FIG. 2A.
Figure 2D:
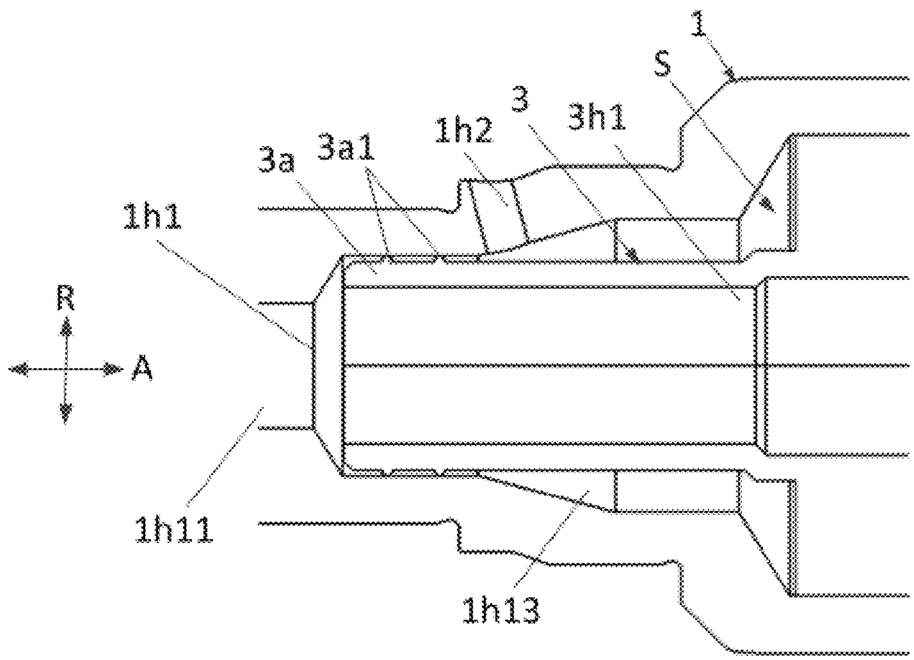
FIG. 2D is a schematic enlarged view of region M1 of the transmission mechanism having the cooling flow path in FIG. 2A.

Specifically, in this embodiment, as shown in FIG. 2A to FIG. 2E, a main shaft through-hole 1*h*1 extending along an axial direction A is formed in the main shaft 1. An opening of the main shaft through-hole 1*h*1 at one axial end portion of the main shaft 1 is used as an inlet for the cooling medium to enter the transmission mechanism, and an opening of the main shaft through-hole 1*h*1 at the other axial end portion of the main shaft 1 is used as a mounting port for inserting the inner cylinder 3 into the main shaft through-hole 1*h*1. From the one axial end portion to the other axial end portion (that is, from the inlet to the mounting port), the main shaft through-hole 1*h*1 includes a first axial section 1*h*11, an intermediate section 1*h*13, and a second axial section 1*h*12 which are in communication with one another. A cross-sectional area of the main shaft through-hole 1*h*1 increases in stages as the main shaft through-hole 1*h*1 passes through the first axial section 1*h*11, the intermediate section 1*h*13 and the second axial section 1*h*12. A cross-sectional area of the first axial section 1*h*11 is substantially the same over its entire axial length. A cross-sectional area of the second axial section 1*h*12 is substantially the same over its entire axial length. As shown in FIG. 2D, the cross-sectional area of the intermediate section 1*h*13 is different at different parts of the intermediate section 1*h*13. In some parts, the cross-sectional area of the intermediate section 1*h*13 gradually increases toward the second axial section 1*h*12, while in some parts, the cross-sectional area of the intermediate section 1*h*13 remains unchanged.

As shown in FIG. 2A and FIG. 2B, three discharge holes 1*h*2 extending obliquely relative to a radial direction R are formed in the main shaft 1. The three discharge holes 1*h*2 are evenly spaced apart in a circumferential direction C of the main shaft 1, and are located at the intermediate section 1*h*13 of the main shaft through-hole 1*h*1 and extend through a wall of the main shaft 1. In this way, the discharge holes 1*h*2 are in communication with the intermediate section 1*h*13 of the main shaft through-hole 1*h*1.

Figure 2E:
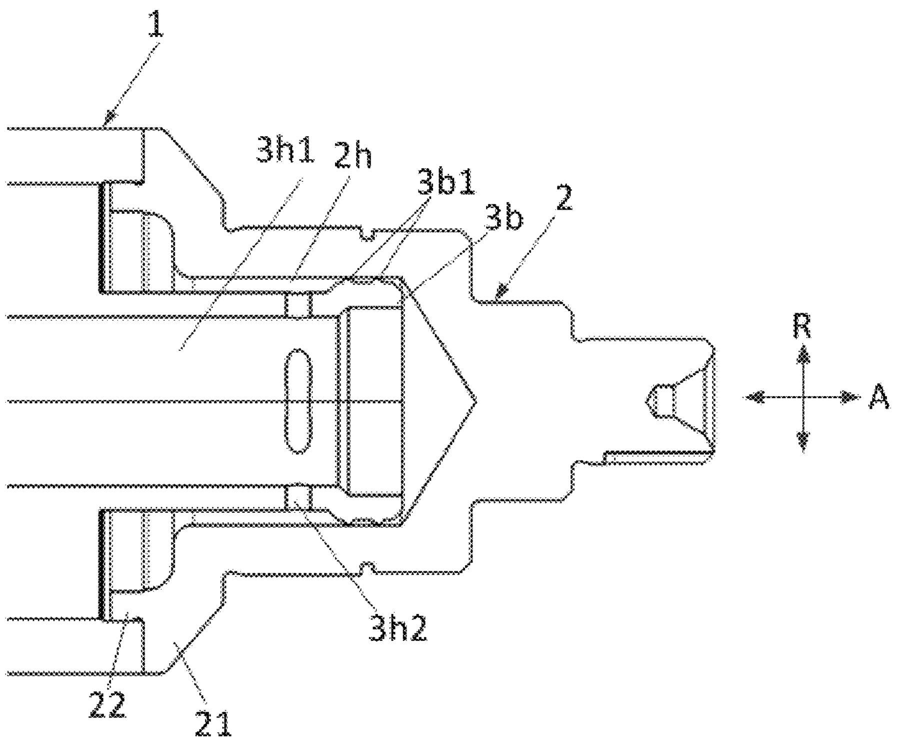
FIG. 2E is a schematic enlarged view of region M2 of the transmission mechanism having the cooling flow path in FIG. 2A.
Figure 3A:
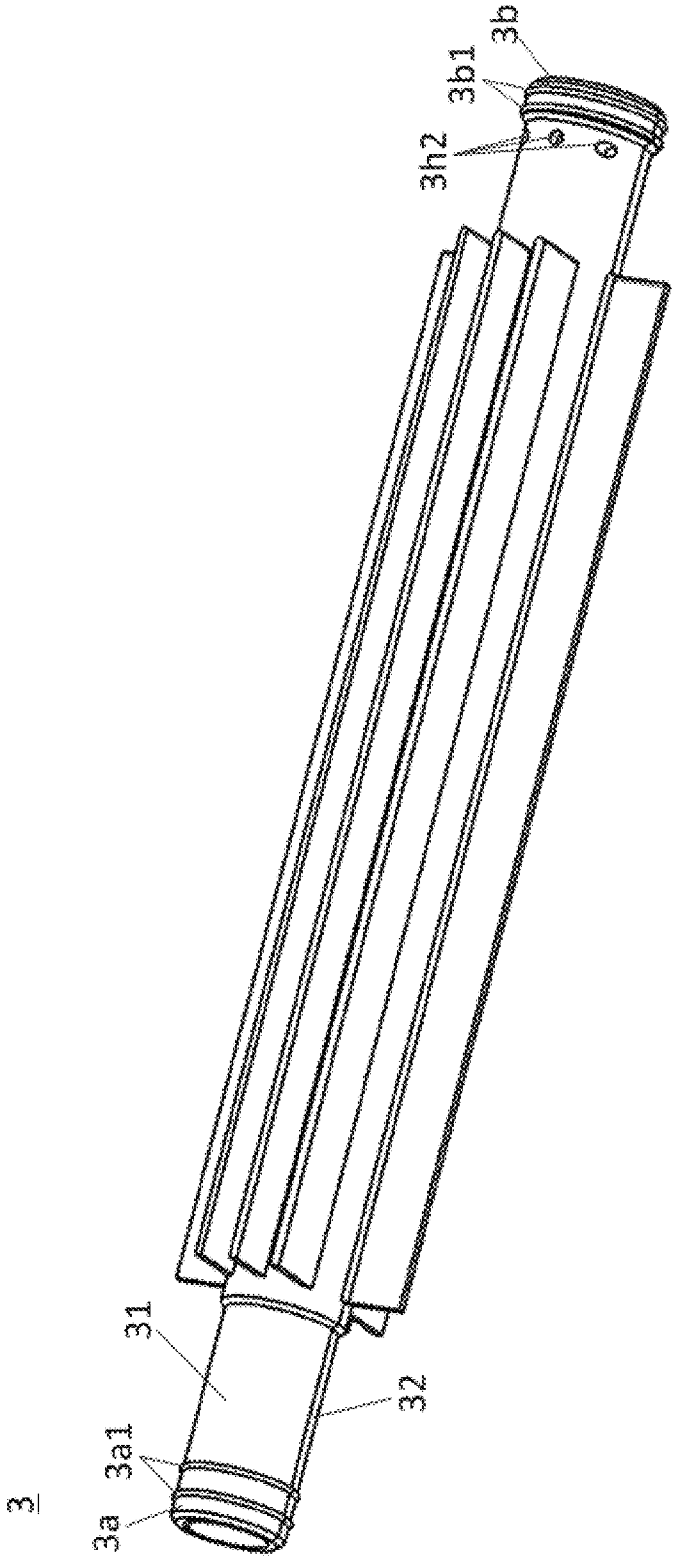
FIG. 3A is a schematic perspective view of an inner cylinder of the transmission mechanism having the cooling flow path in FIG. 2A.
Figure 3B:
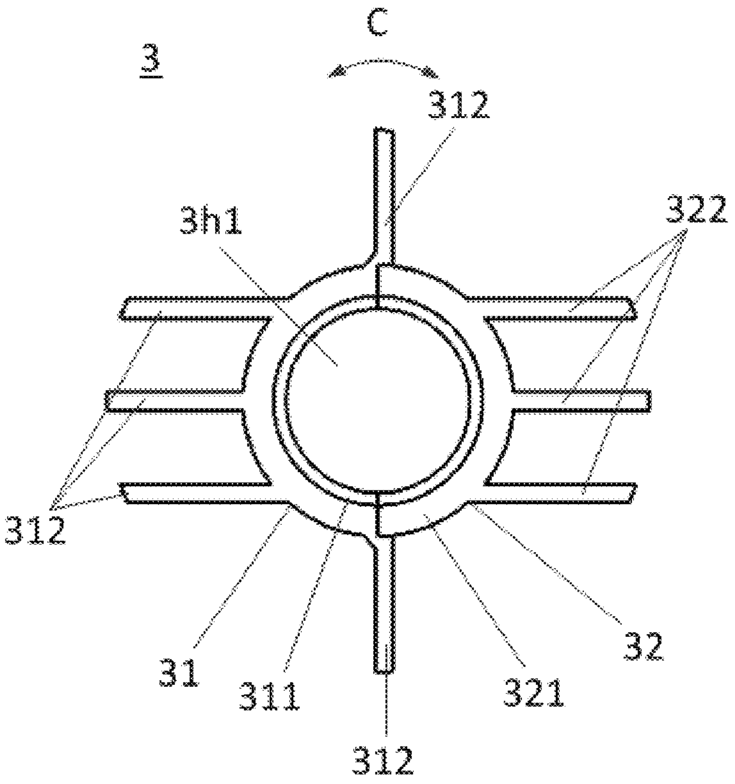
FIG. 3B is a schematic side view of the inner cylinder of the transmission mechanism having the cooling flow path in FIG. 3A.

Further, in this embodiment, as shown in FIG. 2A, FIG. 2C and FIG. 2E, the shaft cap 2 is fixed at the other axial end portion of the main shaft 1 by interference fit, so as to seal the opening of the main shaft through-hole 1*h*1 at the other axial end portion of the main shaft 1.

As shown in FIG. 2A and FIG. 2E, the shaft cap 2 includes a flange portion 21 that fits with the other axial end portion of the main shaft 1, and the flange portion 21 abuts against the other axial end portion of the main shaft 1. The shaft cap 2 is provided with a mounting portion 22 protruding toward the main shaft 1 on a radial inner side of the flange portion 21. The mounting portion 22 extends into the second axial section 1*h*12 of the main shaft through-hole 1*h*1 and is fixed to the main shaft 1 by interference fit, thereby sealing the opening of the main shaft through-hole 1*h*1 at the other axial end portion of the main shaft 1.

As shown in FIG. 2A and FIG. 2E, a shaft cap blind hole 2*h* in communication with the main shaft through-hole 1*h*1 is formed in the shaft cap 2. In a state that the shaft cap 2 is fixed to the main shaft 1, the main shaft through-hole 1*h*1 is in communication with the shaft cap blind hole 2*h* to together constitute a shaft hole of the shaft assembly.

Further, in this embodiment, as shown in FIG. 2A to FIG. 5B, a central main body of the inner cylinder 3 is cylindrical. The inner cylinder 3 is inserted in a space surrounded by the main shaft 1 and the shaft cap 2, and is fixed relative to the main shaft 1 and the shaft cap 2. In this way, after the inner cylinder 3 is mounted in place, an intermediate space S is formed between an outer circumferential wall of the inner cylinder 3 and an inner circumferential wall of the main shaft 1, and the intermediate space S is mainly located in the second axial section 1*h*12 and the intermediate section 1*h*13 of the main shaft through-hole 1*h*1.

As shown in FIG. 2A, FIG. 2D and FIG. 2E, a central hole 3*h*1 extending through the inner cylinder 3 along the axial direction A is formed inside the inner cylinder 3. An opening of the central hole 3*h*1 at the one axial end portion 3*a* of the inner cylinder 3 is opposite to the first axial section 1*h*11 of the main shaft through-hole 1*h*1. A cross-sectional area of the first axial section 1*h*11 at the other axial end portion is smaller than a cross-sectional area of an opening of the inner cylinder 3 at the one axial end portion 3*a*, so that the inner cylinder 3 cannot be inserted into the first axial section 1*h*11 and the cooling medium flowing through the first axial section 1*h*11 can easily enter the central hole 3*h*1 directly. A communication hole 3*h*2 extends through a wall of the central hole 3*h*1 and is formed in a part of the inner cylinder 3 inserted into the shaft cap blind hole 2*h* of the shaft cap 2.

Further, a part of the inner cylinder 3 including the one axial end portion 3*a* of the inner cylinder 3 extends into the intermediate section 1*h*13 of the main shaft through-hole 1*h*1, and a gap is formed, in the radial direction R, between the outer circumferential wall of a cylindrical main body of the part and the main shaft 1. Two protruding first annular rib portions 3*a*1 are formed on the outer circumferential wall of the inner cylinder 3 at the one axial end portion 3*a*. The two first annular rib portions 3*a*1 are spaced apart and arranged side by side in the axial direction A, each of the first annular rib portions 3*a*1 extends along the circumferential direction C over the entire circumference, and the first annular rib portions 3*a*1 abut against the inner circumferential wall of the main shaft 1, to seal the gap between the outer circumferential wall of the inner cylinder 3 at the one axial end portion 3*a* and the main shaft 1. Therefore, the cooling medium entering the first axial section 1*h*11 through the inlet is not directly discharged from the discharge hole 1*h*2 through the above gap, but enters the central hole 3*h*1 of the inner cylinder 3. A part of the inner cylinder 3 including the other axial end portion 3*b* extends into the shaft cap blind hole 2*h* of the shaft cap 2, and a gap is formed, in the radial direction R, between the outer circumferential wall of a cylindrical main body of the part and the shaft cap 2. Two protruding second annular rib portions 3*b*1 are formed on the outer circumferential wall of the inner cylinder 3 at the other axial end portion 3*b*. The two second annular rib portions 3*b*1 are spaced apart and arranged side by side in the axial direction A, each of the second annular rib portions 3*b*1 extends along the circumferential direction C over the entire circumference, and the second annular rib portions **3*b*1 abut against the inner circumferential wall of the main shaft 1, to seal the gap between the outer circumferential wall of the inner cylinder 3 at the other axial end portion 3*b* and the main shaft 1. As such, the cooling medium flowing into the intermediate space S through the communication hole 3*h*2 of the inner cylinder 3 flows along the axial direction A toward the discharge hole 1*h*2, instead of directly returning back to the central hole 3*h*1 from the opening of the inner cylinder 3 at the other axial end portion 3*b*** through the above-mentioned gap.

Further, as shown in FIG. 2A to FIG. 5B, the inner cylinder 3 includes a first circumferential portion 31 and a second circumferential portion 32. The first circumferential portion 31 includes a first arc-shaped main body 311, multiple first rib portions 312 and a position-limiting recess 313. The second circumferential portion 32 includes a second arc-shaped main body 321 fitting with the first arc-shaped main body 311, multiple second rib portions 322 and a position-limiting protrusion 323 fitting with the position-limiting recess 313. A circumferential end portion of the first arc-shaped main body 311 closely abuts against a circumferential end portion the second arc-shaped main body 321 by a reaction force of the first rib portion 312 and the second rib portion 322 abutting against the inner circumferential surface of the main shaft 1, so that the first circumferential portion 31 and the second circumferential portion 32 are closely engaged with each other without a gap, and jointly define the central hole **3*h*1 of the inner cylinder 3**.

Figure 4A:
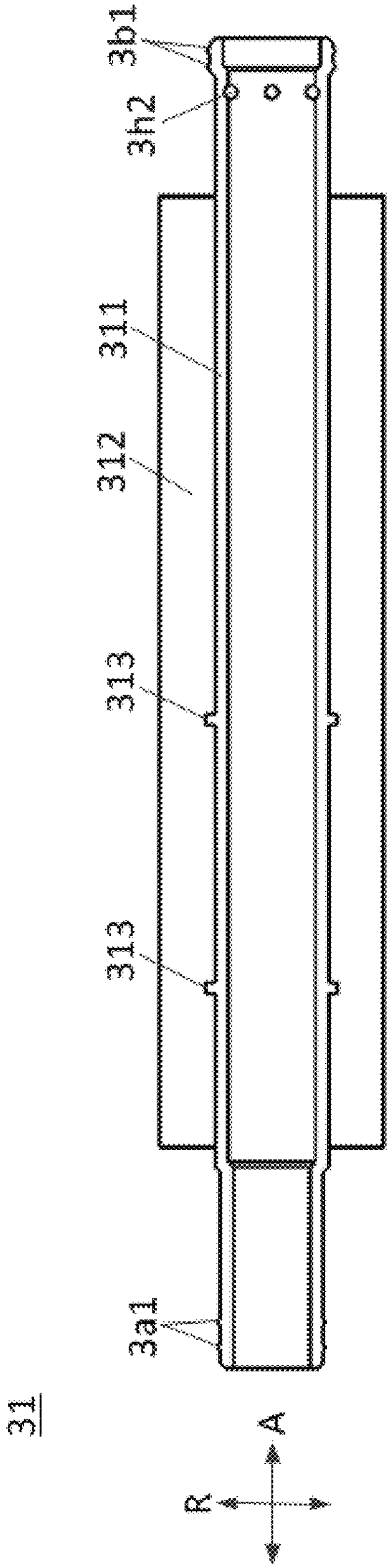
FIG. 4A is a schematic front view of a first circumferential portion of the inner cylinder in FIG. 3A.
Figure 4B:
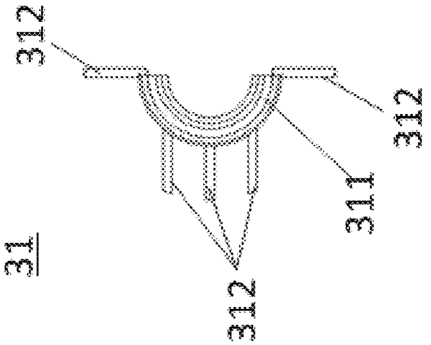
FIG. 4B is a schematic side view of the first circumferential portion in FIG. 4A.
Figure 5A:
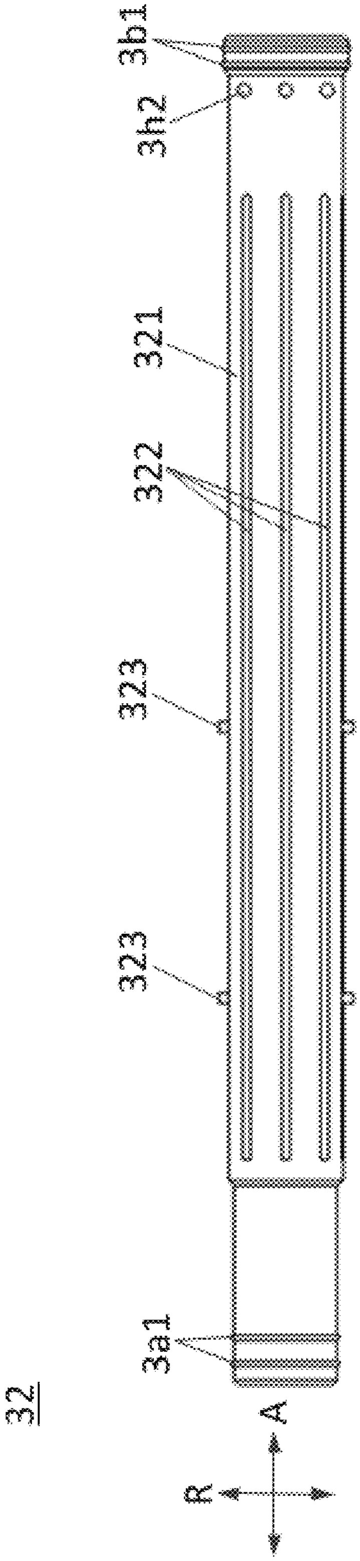
FIG. 5A is a schematic front view of a second circumferential portion of the inner cylinder in FIG. 3A.
Figure 5B:
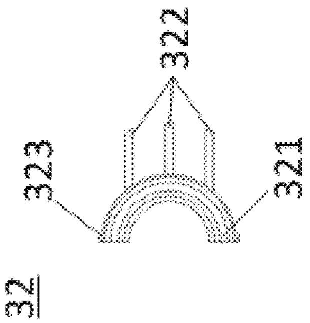
FIG. 5B is a schematic side view of the second circumferential portion in FIG. 5A.

The first arc-shaped main body 311 and the second arc-shaped main body 321 extend in the axial direction A and each have an arc-shaped cross section. On the one hand, as shown in FIG. 2B and FIG. 4B, the circumferential end portion of the first arc-shaped main body 311 is recessed, and the circumferential end portion of the second arc-shaped main body 321 is inserted into the recessed circumferential end portion, so that the first circumferential portion 31 is fixed relative to the second circumferential portion 32 in the circumferential direction C and the radial direction R. On the other hand, the first circumferential portion 31 has two position-limiting recesses 313 spaced apart in the axial direction A, and the second circumferential portion 32 has two position-limiting protrusions 323 spaced apart in the axial direction A. The paired position-limiting recesses 313 and the position-limiting protrusions 323 fit with each other, so that the first circumferential portion 31 is fixed relative to the second circumferential portion 32 in the axial direction A. In this way, the relative movement between the first circumferential portion 31 and the second circumferential portion 32 in the circumferential direction C, the radial direction R and the axial direction A is limited by the above structure, so that the central main body of the inner cylinder 3 always maintains a gap-free cylindrical shape.

As shown in FIG. 3A to FIG. 5B, five first rib portions 312 extend from different circumferential parts of the first arc-shaped main body 31 and abut against different circumferential parts of the inner circumferential wall of the main shaft 1, and the five first rib portions 312 each have a flat plate shape and extend along the axial direction A. Among these five first rib portions 312, three of the first rib portions 312 are parallel to each other, the other two of the first rib portions 312 are respectively arranged at two circumferential end portions of the first arc-shaped main body 311 and extend in opposite directions, and these two first rib portions 312 are perpendicular to the three first rib portions 312 arranged in parallel. Three second rib portions 322 extend from different circumferential parts of the second arc-shaped main body 32 and abut against different circumferential parts of the inner circumferential wall of the main shaft 1, and the three second rib portions 322 each have a flat plate shape and extend along the axial direction A. The three second rib portions 322 are parallel to each other. The three second rib portions 322 correspond to the three first rib portions 312 arranged in parallel in position and extend in a direction opposite to the three first rib portions 312 arranged in parallel.

Further, the first circumferential portion 31 and the second circumferential portion 32 are both made of plastic, which facilitates tight engagement between the first circumferential portion 31 and the second circumferential portion 32 and reduces a manufacturing cost.

By using the above structure, the cooling flow path for the cooling medium to flow therein is formed inside the transmission mechanism. In the cooling flow path, the intermediate space S is in communication with the space outside the main shaft 1 through the discharge hole **1*h*2, and the central hole 3*h*1 is in communication with the intermediate space S through the communication hole 3*h*2, so that the cooling medium entering from the inlet can be discharged out of the transmission mechanism through the central hole 3*h*1, the communication hole 3*h*2, the intermediate space S and the discharge hole 1*h*2. In this way, the cooling medium flows in and out on the same side (the left side in FIG. 2A) and flows over the entire length of the main shaft 1**, so as to cool the components over the entire length of the main shaft.

Further, an e-axle drive system including the above-mentioned transmission mechanism is provided according to the present application. The e-axle drive system includes a housing, a transmission and a motor. The housing includes a first space and a second space spaced apart from each other. The transmission is accommodated in the first space, and the motor is accommodated in the second space. An extending length of the main shaft 1 of the transmission mechanism is such set that one part of the main shaft 1 is located in the first space and the other part is located in the second space. The inlet and the discharge hole **1*h*2 of the transmission mechanism are both formed in the part, located in the first space, of the main shaft 1 (that is, located in the first space), so that the inlet and the discharge hole 1*h*2 are in communication with the first space. The rotor of the motor is anti-torsion connected with the part of the transmission mechanism located in the second space. Specifically, the part, corresponding to the second axial section 1*h*12 of the main shaft through-hole 1*h*1, of the main shaft 1** of the transmission mechanism is in interference fit with the rotor of the motor, so as to realize the anti-torsion connection between the two.

In this way, when the e-axle drive system operates, the rotor drives the transmission mechanism to rotate together. As shown in FIG. 2, oil collected from the first space, as a cooling medium, enters the cooling flow path of the transmission mechanism, and the cooling medium entering from the inlet can return to the first space through the central hole **3*h*1, the communication hole 3*h*2, the intermediate space S and the discharge holes 1*h*2**. Therefore, the collected oil from the first space can effectively cool the rotor mounted to the transmission mechanism and located in the second space, thereby improving the heat dissipation capacity of the motor.

The present application is not limited to the above-mentioned embodiments, and those skilled in the art could make various modifications to the above-mentioned embodiments under the teaching of the present application without departing from the scope of the present application. In addition, the following should also be noted.

i. It has been described in the above embodiments that the shaft assembly is composed of the separate main shaft 1 and shaft cap 2 which are fixed together. However, the present application is not limited thereto. It can be understood that the shaft assembly may be of an integral structure, and a shape and a size of the shaft hole inside the shaft assembly may be modified as needed, so as to facilitate installation of the inner cylinder 3 inside the shaft assembly.

ii. It can be understood that a shape of the central hole 3*h*1 of the inner cylinder 3 may be a shape in which the cross-sectional area gradually increases from the one axial end portion of the inner cylinder 3 toward the other axial end portion of the inner cylinder 3, and a shape of the second axial section 1*h*12 of the main shaft through-hole 1*h*1 of the main shaft 1 may be a shape in which the cross-sectional area gradually increases from the other axial end portion of the main shaft 1 toward the one axial end portion of the main shaft 1, thereby promoting the flow of the cooling medium in the cooling flow path by using centrifugal force during the rotation of the transmission mechanism.

iii. It can be understood that the above-mentioned transmission mechanism not only has a low cost, but also is easy to assemble with a short assembly time and can also improve NVH performance.

iv. The e-axle drive system according to the present application is not limited to pure electric vehicles, but may also serve as a portion of a hybrid power system to be used for hybrid power vehicles.

The invention claimed is:

1. A transmission mechanism having a cooling flow path, comprising:

a shaft assembly, wherein a shaft hole and a discharge hole are formed in the shaft assembly, the shaft hole extends along an axial direction of the shaft assembly, an inlet of the shaft hole is formed at one axial end portion of the shaft assembly, and the discharge hole extends through a wall of the shaft hole; and an inner cylinder, wherein the inner cylinder is accommodated in the shaft hole, an intermediate space is formed between an outer circumferential wall of the inner cylinder and an inner circumferential wall of the shaft assembly, a central hole and a communication hole are formed in the inner cylinder, the central hole extends along an axial direction of the inner cylinder and is in communication with the inlet, the communication hole extends through a wall of the central hole, one or more first annular rib portions are formed on the outer circumferential wall of the inner cylinder at one axial end portion, the one or more first annular rib portions abut against the inner circumferential wall of the shaft assembly, to seal a gap between the one axial end portion of the inner cylinder and the shaft assembly, one or more second annular rib portions are formed on the outer circumferential wall of the inner cylinder at the other axial end portion), and the one or more second annular rib portions abut against the inner circumferential wall of the shaft assembly, to seal a gap between the other axial end portion of the inner cylinder and the shaft assembly, wherein the intermediate space is in communication with a space outside the shaft assembly through the discharge hole, and the central hole is in communication with the intermediate space through the communication hole, so that a cooling medium entering from the inlet is discharged out of the shaft assembly through the central hole, the communication hole, the intermediate space and the discharge hole;

wherein the inner cylinder comprises a plurality of circumferential portions made of plastic, the plurality of circumferential portions extend along a circumferential direction of the inner cylinder, a rib portion abutting against the inner circumferential wall of the shaft assembly is formed on each of the plurality of circumferential portions, and the rib portion is configured such that the plurality of circumferential portions are engaged with each other to jointly define the central hole; and wherein each of the circumferential portions has a plurality of rib portions, and the plurality of rib portions extend along the axial direction of the inner cylinder, for one of the circumferential portions, the plurality of rib portions extend from different circumferential parts of the circumferential portion and abut against different circumferential parts of the inner circumferential wall of the shaft assembly.

2. The transmission mechanism having the cooling flow path according to claim 1, wherein the plurality of circumferential portions comprise a first circumferential portion and a second circumferential portion, the first circumferential portion comprises a first arc-shaped main body, the second circumferential portion comprises a second arc-shaped main body fitting with the first arc-shaped main body, the first arc-shaped main body and the second arc-shaped main body extend along the axial direction of the inner cylinder and each have an arc-shaped cross section, and a circumferential end portion of the first arc-shaped main body abuts against a circumferential end portion of the second arc-shaped main body in a state that the first circumferential portion and the second circumferential portion are engaged with each other.

3. The transmission mechanism having the cooling flow path according to claim 2, wherein the circumferential end portion of the first arc-shaped main body is recessed, and the circumferential end portion of the second arc-shaped main body is inserted into the recessed circumferential end portion of the first arc-shaped main body, so that the first circumferential portion is fixed relative to the second circumferential portion in the circumferential direction and a radial direction of the inner cylinder.

4. The transmission mechanism having the cooling flow path according to claim 2, wherein one of the first circumferential portions and the second circumferential portion has a position-limiting recess, the other of the first circumferential portions and the second circumferential portion has a position-limiting protrusion, and the position-limiting recess fits with the position-limiting protrusion, so that the first circumferential portion is fixed relative to the second circumferential portion in the axial direction of the inner cylinder.

5. The transmission mechanism having the cooling flow path according to claim 1, wherein the shaft assembly comprises a main shaft and a shaft cap, a main shaft through-hole extending along an axial direction of the main shaft is formed in the main shaft, an opening of the main shaft through-hole at one axial end portion of the main shaft is used as the inlet, and the shaft cap is fixed at the other axial end portion of the main shaft to seal an opening of the main shaft through-hole at the other axial end portion of the main shaft.

6. The transmission mechanism having the cooling flow path according to claim 5, wherein the main shaft through-hole comprises a first axial section, an intermediate section and a second axial section which are arranged from the one axial end portion of the main shaft to the other axial end portion of the main shaft and are in communication with one another, a cross-sectional area of the main shaft through-hole increases in stages as the main shaft through-hole passes through the first axial section, the intermediate section and the second axial section, the discharge hole is in communication with the intermediate section, and a part of the inner cylinder comprising the one axial end portion of the inner cylinder extends into the intermediate section, a shaft cap blind hole in communication with the main shaft through-hole is formed in the shaft cap, and a part of the inner cylinder comprising the other axial end portion of the inner cylinder extends into the shaft cap blind hole.

7. An e-axle drive system comprising:

a transmission having a cooling flow path, the transmission including:

a shaft assembly, wherein a shaft hole and a discharge hole are formed in the shaft assembly, the shaft hole extends along an axial direction of the shaft assembly, an inlet of the shaft hole is formed at one axial end portion of the shaft assembly, and the discharge hole extends through a wall of the shaft hole; and an inner cylinder, wherein the inner cylinder is accommodated in the shaft hole, an intermediate space is formed between an outer circumferential wall of the inner cylinder and an inner circumferential wall of the shaft assembly, a central hole and a communication hole are formed in the inner cylinder, the central hole extends along an axial direction of the inner cylinder and is in communication with the inlet, the communication hole extends through a wall of the central hole, one or more first annular rib portions are formed on the outer circumferential wall of the inner cylinder at one axial end portion, the one or more first annular rib portions abut against the inner circumferential wall of the shaft assembly, to seal a gap between the one axial end portion of the inner cylinder and the shaft assembly, one or more second annular rib portions are formed on the outer circumferential wall of the inner cylinder at the other axial end portion, and the one or more second annular rib portions abut against the inner circumferential wall of the shaft assembly, to seal a gap between the other axial end portion of the inner cylinder and the shaft assembly, wherein the intermediate space is in communication with a space outside the shaft assembly through the discharge hole, and the central hole is in communication with the intermediate space through the communication hole, so that a cooling medium entering from the inlet is discharged out of the shaft assembly through the central hole, the communication hole, the intermediate space and the discharge hole; and wherein the e-axle drive system further comprises a housing, a transmission and a motor, wherein the housing comprises a first space and a second space spaced apart from each other, the transmission is accommodated in the first space, the motor is accommodated in the second space, both the inlet and the discharge hole are located in the first space, and a rotor of the motor is anti-torsion connected with a part of the transmission mechanism located in the second space.

8. The e-axle drive system according to claim 7, wherein the inner cylinder comprises a plurality of circumferential portions made of plastic, the plurality of circumferential portions extend along a circumferential direction of the inner cylinder, a rib portion abutting against the inner circumferential wall of the shaft assembly is formed on each of the plurality of circumferential portions, and the rib portion is configured such that the plurality of circumferential portions are engaged with each other to jointly define the central hole.

9. The e-axle drive system according to claim 8, wherein the plurality of circumferential portions comprise a first circumferential portion and a second circumferential portion, the first circumferential portion comprises a first arc-shaped main body, the second circumferential portion comprises a second arc-shaped main body fitting with the first arc-shaped main body, the first arc-shaped main body and the second arc-shaped main body extend along the axial direction of the inner cylinder and each have an arc-shaped cross section, and a circumferential end portion of the first arc-shaped main body abuts against a circumferential end portion of the second arc-shaped main body in a state that the first circumferential portion and the second circumferential portion are engaged with each other.

10. The e-axle drive system according to claim 9, wherein the circumferential end portion of the first arc-shaped main body is recessed, and the circumferential end portion of the second arc-shaped main body is inserted into the recessed circumferential end portion of the first arc-shaped main body, so that the first circumferential portion is fixed relative to the second circumferential portion in the circumferential direction and a radial direction of the inner cylinder.

11. The e-axle drive system according to claim 9, wherein one of the first circumferential portions and the second circumferential portion has a position-limiting recess, the other of the first circumferential portions and the second circumferential portion has a position-limiting protrusion, and the position-limiting recess fits with the position-limiting protrusion, so that the first circumferential portion is fixed relative to the second circumferential portion in the axial direction of the inner cylinder.

12. The e-axle drive system according to claim 8, wherein each of the circumferential portions has a plurality of rib portions, and the plurality of rib portions extend along the axial direction of the inner cylinder, for one of the circumferential portions, the plurality of rib portions extend from different circumferential parts of the circumferential portion and abut against different circumferential parts of the inner circumferential wall of the shaft assembly.

13. The e-axle drive system according to claim 7, wherein the shaft assembly comprises a main shaft and a shaft cap, a main shaft through-hole extending along an axial direction of the main shaft is formed in the main shaft, an opening of the main shaft through-hole at one axial end portion of the main shaft is used as the inlet, and the shaft cap is fixed at the other axial end portion of the main shaft to seal an opening of the main shaft through-hole at the other axial end portion of the main shaft.

14. The e-axle drive system according to claim 13, wherein the main shaft through-hole comprises a first axial section, an intermediate section and a second axial section which are arranged from the one axial end portion of the main shaft to the other axial end portion of the main shaft and are in communication with one another, a cross-sectional area of the main shaft through-hole increases in stages as the main shaft through-hole passes through the first axial section, the intermediate section and the second axial section, the discharge hole is in communication with the intermediate section, and a part of the inner cylinder comprising the one axial end portion of the inner cylinder extends into the intermediate section, a shaft cap blind hole in communication with the main shaft through-hole is formed in the shaft cap, and a part of the inner cylinder comprising the other axial end portion of the inner cylinder extends into the shaft cap blind hole.

* * * * *